United States Patent Office 3,235,534
Patented Feb. 15, 1966

3,235,534
POLYAMIDES CONTAINING PHOSPHINIC ACIDS WITH IMPROVED AFFINITY FOR DYES
George H. Brinkman, Jr., and Donald L. Elbert, Gulf Breeze, Santa Rosa, Fla., assignors, by mesne assignments, to Monsanto Company, a corporation of Delaware
No Drawing. Filed July 15, 1960, Ser. No. 42,963
14 Claims. (Cl. 260—78)

This invention relates to modified synthetic linear polycarbonamides having an improved receptivity for acid dyes and to a process for producing same.

The polymeric substances with which this invention is concerned are synthetic, high molecular weight, fiber-forming polycarbonamides of the general type characterized by the presence of recurring carbonamide groups as an integral part of the polymer chain, and wherein such groups are separated by at least two carbon atoms. They are further characterized by high melting point, pronounced crystallinity, and insolubility in most solvents except mineral acids, formic acid, and the phenols. Upon hydrolysis with strong mineral acids, the polymers revert to the reactants from which they were formed.

The simple polyamides of this type are usually made by heating substantially equimolecular proportions of a diamine with a dicarboxylic acid until the product has polymerized to the fiber-forming stage, which stage is not generally reached until the polyamide has an intrinsic viscosity of at least 0.4, the intrinsic viscosity being defined as $$\frac{\text{Log}_e n_r}{C}$$

in which $n_r$ is the relative viscosity of a dilute solution of the polymer in m-cresol in the same units and at the same temperature, and C is the concentration in grams of polymer per 100 cc. of solution. The polymers thus obtained have high melting points and can be cold or hot drawn to form strong, highly oriented fibers.

The diamines and dicarboxylic acids or amide-forming derivatives thereof which can be used as reactants to yield the simple fiber-forming polyamides are well known to the art. Suitable diamines may be represented by the general formula $NH_2[CH_2]_nNH_2$ in which $n$ is an integer of 2 or greater and preferably from 2 to 10. Representative examples are ethylenediamine, propylenediamine, tetramethylenediamine, pentamethylenediamine, hexamethylenediamine, octamethylenediamine and decamethylenediamine. Suitable dicarboxylic acid reactants are represented by the general formula HOOCRCOOH in which R is a divalent hydrocarbon radical having a chain length of at least two carbon atoms. These dicarboxylic acids are illustrated by sebacic acid, octadecenedioic acid, adipic acid, suberic acid, azelaic acid, undecanedioic acid, glutaric acid, pimelic acid, brassylic acid and tetradecanedioic acid. The amide-forming derivatives of diamines which can be employed include the carbamate and N-formyl derivative. Suitable amide-forming derivatives of the dibasic carboxylic acids comprise the mono- and di-ester, the anhydride, the mono- and di-amide and the acid halide.

While textiles produced from the afore-noted polyamides can be dyed with various anionic type dyes, considerable difficulty is encountered when attempts are made to obtain the deeper shades of color because of the limited chemical affinity of these polymers for applicable dyestuffs.

This limited affinity for dyes not only restricts the depth of obtainable color, but also greatly limits the range of dyes which may be used on these materials. Thus, dyers are often precluded from employing the more economic dyestuffs or those having especially outstanding properties, such as greater lightfastness and washfastness. These shortcomings could be overcome, of course, if satisfactory means were available for increasing the chemical affinity of these polymeric substances for anionic dyestuffs.

Methods for accomplishing this desired objective have been proposed heretofore, but for one reason or another they could not be successfully employed in commercial practice. For example, many types of chemical treatments of polyamide fabrics have been proposed in the past. However, it has been found that the chemical treatment of an already formed polymer does not increase the capacity of the polymer for absorbing a greater amount of dye, but merely facilitates take-up of the normal quantity of dye. Moreover, large quantities of treating agents are usually required for obtaining even this limited advantage, i.e. often as much as 10 percent on the weight of the fabric.

Another approach taken to the problem previously has been to employ an excess of diamine as a viscosity stabilizer during the polyamide-forming polymerization in order to increase the amine end group concentration and hence the number of active dye sites. It has been found that polymer dye affinity can be improved in this manner but that serious product and processing difficulties are encountered when employing this technique. That is, yarn obtained from polymers processed in this manner is generally discolored. Furthermore, excessive inter-batch variations in dye affinity are experienced as well as a substantial increase in the gelation rate during spinning. It is, therefore, apparent that a need exists for more effective and satisfactory methods than are presently available for improving the dye affinity of synthetic linear polyamides.

Accordingly, it is a principal object of this invention to provide an effective and practical method for producing synthetic linear polycarbonamides with a greater receptivity for acidic dyestuffs.

It is a further object of this invention to provide novel synthetic linear polycarbonamides which can be dyed to deep shades with acid dyestuffs.

In general, the objects of this invention are accomplished by polymerizing the polyamide-forming monomer in the presence of a minor amount of a compound selected from the group consisting of mono- and di-alkyl, mono- and di-aryl, and monoalkyl monoaryl phosphinic acids, and the diamine salts of these phosphinic acids.

Those phosphinic acids, which as the acids or the diamine salts thereof, are useful in the present invention are those represented by the general formula

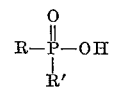

wherein R may be a monovalent alkyl or aryl hydrocarbon radical or hydrogen and R' may be a monovalent alkyl or aryl hydrocarbon radial.

When the aforementioned diamine salts are employed, they may be obtained by reacting equivalent weights of the phosphinic acid compound of choice with a diamine represented by the general formula $NH_2[CH_2]_nNH_2$ in which $n$ is an integer of 2 or greater and preferably from 2 to 20. Illustrative examples of applicable diamines are ethylenediamine, propylenediamine, tetramethylenediamene, pentamethylenediamine, hexamethylenediamine, octamethylenediame, decamethylenediamine, undecamethylenediamine, dodecamethylenediamine, tridecamethylenediamine, tetradecamethylenediamine, pentadecamethylenediamine, hexadecamethylenediamine, octadecamethylenediamine and nonadecamethylenediamine. The diamine used to form the phosphinic acid salt may be the same as that employed in the polyamide monomer, but it is not necessary that the diamines be identical. That is, different diamines may be present in forming the polymers of this invention.

In the practice of the invenion, the afore-noted modifying agents may be introduced into the polymerization autoclave with the polyamide-forming reactants, which may be in the form of previously uncombined diamine and dicarboxylic acid or as a pre-formed salt. Alternatively, the modifying agents may be introduced into the autoclave at some late stage after the polymerization reaction has begun. In any event, it is important that the modifying agents be present during polymer preparation as will be demonstrated in the examples hereinafter.

The phosphinic acids or their diamine salts are generally used in an amount of from about 0.70 to 14.0 mol percent based on the molecular weight of the polyamide-forming monomer employed with from about 0.7 to 1.7 mol percent being preferred.

In preparing the above described modified polymers the same well-known reaction conditions are employed as are used in preparing conventional fiber-forming polyamides. That is, the reactants are heated at a temperature of from 180° C. to 300° C. and preferably from 200° C. to 295 C. until the product has a sufficiently high molecular weight to exhibit fiber-forming properties. This condition is reached when the polymer has an instrinsic viscosity of at least 0.4 in accordance with the definition of intrinsic viscosity as given hereinabove. The reaction can be conducted at super-atmospheric, atmospheric, or sub-atmospheric pressure. Often it is desirable, especially in the last stage of the reaction, to employ conditions, e.g. reduced pressure, which will aid in the removal of the reaction by-products.

It has been found that textile products, which have been produced from the synthetic linear polyamides of this invention, shown an acid dye saturation level exceeding that of textiles obtained from conventional polyamides by a factor up to 85 percent and more. By dye saturation level there is meant the weight percent of dye absorbed by the fiber at equilibrium conditions.

We are aware that phosphinic acids and various derivatives thereof have been used heretofore in the art pertaining to polyamide textiles. More specifically, nylon fabrics have been treated with these compounds in the past to enhance stability at elevated temperatures. However, as will be shown in the comparative test data presented hereinafter, the acid dye saturation level of polyamide textiles is not affected when end-products such as fabrics are treated with the chemical agents contemplated by this invention.

We are also cognizant of the prior practice in which polyamides are prepared in the presence of metal phosphinates, such as sodium phenyl phosphinate, in order to increase the draw ratio at constant break elongation of the filaments produced therefrom. However, the metal salt derivatives of phosphenic acids do not improve the inherent dye saturation level of polyamides when such polymers are prepared in the presence of these compounds.

In order to illustrate the present invention and the advantages obtainable therewith in greater detail, the following examples are presented, it being understood that they are merely illustrative and are not to be taken as limitative in any sense.

In the examples below the term "relative viscosity" refers to the value determined by the formula $$N_{rel} = \frac{\text{Time of flow of polymer solution}}{\text{Time of flow of solvent}}$$

when a solution is allowed to flow by gravity at 25° C. through a capillary viscosity tube. To determine the relative viscosity of polyamides a solvent of 90 percent formic acid is usually employed.

*Example I*

A stainless steel autoclave was charged with 406 parts of an aqueous solution containing 50 percent by weight of hexamethylene diammonium adipate and a sufficient amount of acetic acid in aqueous solution to obtain a polymer having a relative viscosity value of 34. The autoclave, which had been purged of air by steam, was pressured and heated, and when a temperature of 170° C. was reached there was added 1.03 mol percent of the hexamethylenediamine salt of penyl phosphinic acid based on the hexamethylene diammonium adipate charged. Heating was continued and when a temperature of 210° C. was obtained an aqueous slurry of titanium dioxide was added to the reaction mass (an amount sufficient to produce a semi-delustered yarn, i.e. 0.3 percent on the weight of the yarn). The heating of the autoclave was continued until a temperature of 220° C. and a pressure of 250 p.s.i.g. was reached. At this stage the bleeding off of water vapor was begun. The polymerization cycle was then continued by increasing the autoclave temperature to a value of 243° C. while the pressure was held constant. At this point the pressure reduction cycle began with the pressure being reduced to atmospheric over a period of 90 minutes where it was held for 30 minutes. The molten polymer thus obtained was then extruded in the form of a ribbon upon a casting wheel. After quenching it was cut into chips suitable for re-melting at the grid of a spinning assembly. The polymer flake obtained was then spun on conventional melt spinning equipment and stretched on a drawtwister. The final deiner of the 13 filament yarn was 40. Elongation at break was 27 percent.

*Example II*

A batch of polymer was prepare following the technique of Example I, but for the hexamethylenediamine salt of phenyl phosphinic acid there was substituted 1.03 mol percent of phenyl phosphinic acid based on the hexamethylene diammonium adipate monomer charged.

*Example III*

A batch of polymer was prepared following the technique of Example I, but in place of the hexamethylenediamine salt of phosphinic acid there was substituted 1.37 mol percent of phenyl phosphinic acid based on the hexamethylene diammonium adipate.

*Example IV*

A batch of polymer was prepared following the technique of Example I, but in place of the hexamethylenediamine salt of phenyl phosphinic acid, there was substituted 1.72 mol percent of phenyl phosphinic acid based on the hexamethylene diammonium adipate.

*Example V*

This example illustrates the preparation of an unmodified, conventional fiber-forming polyamide.

A stainless steel autoclave was charged with 406 parts of an aqueous solution containing 50 percent by weight of hexamethylene diammoniumadipate and 0.6 part of an aqueous solution containing 25 percent by weight of acetic acid, as a viscosity stabilizer. The autoclave, which had been purged of air by steam pressure, was then slowly heated and when a temperature of approximately 210° C. was reached an aqueous slurry of titanium dioxide was added to the reaction mass (an amount sufficient to produce a semi-delustered yarn, i.e. 0.3 percent on the weight of the yarn). The heating of the autoclave was continued until a temperature of 220° C. and a pressure of 250 p.s.i.g. was reached. At this stage the bleeding off of water vapor was begun. The polymerization cycle was then continued by increasing the autoclave temperature to a value of 243° C. while the pressure was held constant. At this point the pressure reduction cycle began with the pressure being reduced to atmospheric over a period of 90 minutes where it was held for 30 minutes. The molten polymer thus obtained was then extruded in the form of a ribbon upon a casting wheel. After quenching it was cut into chips suitable for re-melting at the grid of a spinning assembly. The polyhexamethylene adipamide flake obtained was then spun on conventional melt spinning equipment and stretched on a drawtwister. The final denier of the 13 filament yarn was 40. Elongation at break was 27 percent.

*Example VI*

This example illustrates the prior use of phenyl phosphinic acid for treating polyamide fabrics.

A portion of the yarn obtained in Example V was used to fabricate a 4 inch length sample of a jersey stitch knit tubing. This tubing was then impregnated in conventional fabric treating equipment with a solution of phenyl phosphinic acid in ethanol in an amount such that 9.17 percent by weight of phenyl phosphinic acid based on the weight of the knit tubing was retained thereon.

*Example VII*

This example illustrates the prior use of metal phosphinates as modifying agents in the preparation of synthetic linear polyamides.

A stainless steel autoclave was charged with 406 parts of an aqueous solution containing 50 percent by weight of hexamethylene diammonium adipate and 0.6 part of an aqueous solution containing 25 percent by weight of acetic acid, as a viscosity stablizer. The autoclave, which had been purged of air by steam, was slowly pressured and heated, and when a temperature of 170° C. was reached there was added 1.03 mol percent sodium phenyl phosphinate based on the weight of the monomer. Heating was continued and when a temperature of 210° C. was obtained an aqueous slurry of titanium dioxide was added to the reaction mass (an amount sufficient to produce a semi-delustered yarn, i.e. 0.3 percent on the weight of the yarn). The heating of the autoclave was continued until a temperature of 220° C. and a pressure of 250 p.s.i.g. was reached. At this stage the bleeding off of water vapor was begun. The polymerization cycle was then continued by increasing the autoclave temperature to a value of 243° C. while the pressure was held constant. At this point the pressure reduction cycle began with the pressure being reduced to atmospheric over a period of 90 minutes where it was held for 30 minutes. The molten polymer thus obtained was then extruded in the form of a ribbon upon a casting wheel. After quenching it was cut into chips suitable for re-melting at the grid of a spinning assembly. The polyhexamethylene adipamide flake obtained was then spun on conventional melt spinning equipment and stretched on a drawtwister. The final denier of the 13 filament yarn was 40. Elongation at break was 27 percent.

From the yarn obtained in each of the above-described examples there was fabricated a 4 inch length sample of knit tubing. Tests were then run on each of the samples to determine their relative dye saturation levels. In the procedure used for the test each of the samples was dyed with equal concentrations of the commercial dyestuff Scarlet 4RA (C.I. Acid Red 18). The dyeing was continued over a period of two hours in a bath having a liquor ratio of 40:1, and maintained at a temperature of 212° F. Following the completion of dyeing, the amount of dye absorbed by each sample was determined by measuring spectrophotometrically the changes in dye bath concentration, i.e., the difference between the original dye concentration in the bath and the dye concentration at equilibrium. The following results were obtained in these tests.

| Example | Initial Acid Dye Conc., Percent on Weight of Fabric | Percent Acid Dye Absorbed on Weight of Fabric |
|---|---|---|
| I | 3.0 | 2.64 |
| II | 3.0 | 2.14 |
| III | 3.0 | 2.46 |
| IV | 3.0 | 2.59 |
| V (Control) | 3.0 | 1.41 |
| VI | 3.0 | 1.24 |
| VII | 3.0 | 1.53 |

From the above test results, it is readily apparent that Examples I through IV, which are embodiments of the present invention, show substantial improvement in dye absorption capacity over the control Example V, i.e. an increase ranging from 51 percent to 86 percent. It is also clearly evident that the heretofore known procedure of treating polyamide fabric with phosphinic acid compounds does not improve the dyeing characteristics thereof as shown in the above table by the test results of Example VI. Also, from the test results in the table above for Example VII, it is shown that the sodium salt of phenyl phosphinic acid is not effective for accomplishing the purposes of this invention. Although the dye absorption value for Example VII is shown to be slightly higher than that of the control, the difference is well within the range of sample variance.

Although the theoretical basis for the surprising increase in acid dye affinity of the polymers obtained in accordance with this invention over conventional polyamides is not completely understood, these advantages are thought to result, at least in part, by the ability of the modifying agents to combine with diamine in the polymerization reaction zone and thereby minimize the generally experienced losses of this reactant through volatilization. The escape of varying amounts of diamine from the reaction zone through volatilization has been a common experience in conventional polymerization. Consequently, the resulting polymer has less amine end groups than would be present if such diamine loss had not occurred.

An investigation was made to determine the effect on diamine losses when polyamides are formed in accordance with the present invention. In making this determination a series of four batch polymerizations were carried out in a Dowtherm heated autoclave equipped with an off-gas condenser and a condensate receiver. The diamine losses experienced during polymerization were determined by analysis of the off-gas condensate. In addition, quantitative determinations were made on the amine ends present on the resulting polymer products after scouring to remove any unreacted acid or salt thereof. The nature of the runs and the results obtained are presented in the table below:

| Run No. | 1 | 2 | 3 | 4 |
|---|---|---|---|---|
| Modifying agent | None | (1) | (2) | (3) |
| Mol percent of modifying agent based on monomer | | 1.03 | 1.03 | 0.88 |
| Diamine losses during polymerization in equivalents ×10⁶ per gm. of polymer | 40.14 | 31.75 | 41.62 | 34.28 |
| NH₂ ends in equivalents ×10⁶ per gm. of polymer after scouring | 31.8 | 56.0 | 34.7 | 49.2 |

1 Phenyl phosphinic acid.
2 Na salt of phenyl phosphinic acid.
3 Phenyl phosphinic acid.

It is seen from the above table that test runs numbers 2 and 4, which contained the modifying agents of this invention, decreased diamine losses by 20 and 15 percent respectively over the control, test run number 1. In test run 3 wherein the polymerization was conducted in the presence of the sodium salt of phenyl phosphinic acid, there was no decrease in loss of diamine over that of the control.

Inasmuch as yarn discoloration has often resulted from attempts to improve the acid dye affinity of polyamides, color determination tests were run on yarn samples obtained from embodiments of the present invention corresponding to the above described Examples II, III and IV. These samples were compared with a control corresponding to Example V, above.

The test consisted of determinations of the proximity to complete whiteness by reflectance measurements made using a spectrophotometer. The methods employed were those recommended by the Standard Observer and Coordinate System of the International Commission on Illumination, as fully set forth in the Handbook of Colorimetry, published in 1936 by the Technology Press, Massachusetts Institute of Technology. The following results were obtained.

| Example: | Whiteness value |
|---|---|
| II | 98.1 |
| III | 96.7 |
| IV | 96.9 |
| V (control) | 96.7 |

As can be seen from the above test results, the methods of the present invention do not cause objectionable discoloration of the products formed from polymers produced in accordance therewith.

Although phenyl phosphinic acid and the hexamethylenediamine salt thereof have been used in the examples for illustrative purposes, the invention is by no means limited thereto. The di-aryl phosphinic acids, such as diphenyl phosphinic acid and the diamine salts thereof are fully applicable. The mono- and di-alkyl phosphinic acids and their diamine salts may also be employed to advantage. Illustrative examples are butyl phosphinic acid, hexyl phosphinic acid, di-butyl phosphinic acid, ethylhexyl phosphinic acid and the like together with the diamine salts thereof. The monoalkyl monoaryl phosphinic acids and their diamine salts may also be used, such as methyl phenyl phosphinic acid and ethyl tolyl phosphinic acid.

Although the illustrative examples have employed an acid dye, it is to be understood that the advantages of this invention are realized with all classes of anionic dyes which are generally used in dyeing polyamide articles, including acid dyes, milling acid dyes, acid metalized dyes, neutral premetalized dyes, chrome dyes and fiber reactive dyes. Samples of the modified polyhexamethylene adipamide yarns of this invention corresponding to the yarns produced in Example II above which were fabricated into fabric panels alternating with unmodified polyhexamethylene adipamide yarns have been dyed with all the classes of dyes and dyestuffs listed below and in all instances the modified polyamide yarn was dyed to a deeper shade, indicating increased dye receptivity and a higher absorption, than the unmodified yarns.

Leveling acid dyes: Alizarine Cyanine Green GHN (C.I. Acid Green 25), Alizarine Sky Blue BS (C.I. Acid Blue 78), Fast Scarlet BA (C.I. Acid Red 66)
Milling acid dyes: Anthraquinone Blue SWF Conc., Du Pont Milling Yellow 5G Conc. (C.I. Acid Yellow 40)
Acid metalized dyes: Neolan Blue 2G Conc. (C.I. Acid Blue 158A), Neolan Black WA Ex. Conc. (C.I. Acid Black 52), Neolan Pink G (C.I. Acid Red 192)
Neutral premetalized dyes: Cibalan Blue 3 GL (C.I. Acid Blue 171), Cibalan Brilliant Blue GL, Irgalan Blue RL (C.I. Acid Blue 166)
Fiber reactive dye: Cibacron Blue 3G Thus, all classes of anionic dyes which are generally used to dye polyamide fibers are applicable to the modified polyamide fibers of this invention.

The modified synthetic linear polyamides of this invention are of primary interest in the production of yarns and fabrics, however, they may also be employed to advantage in the production of other products where an enhanced receptivity for dyes may be desired, e.g. bristles, films and the like. In preparing these polyamides other modifying agents which may be useful for a particular end product may be added, such as for example delusterants, anti-oxidants, plasticizers and others.

As many differing embodiments of this invention may be made without departing from the spirit and scope thereof, it will be understood that the invention is not to be limited by the specific embodiments set forth herein but only by the appended claims.

We claim:

1. A fiber-forming synthetic linear polycarbonamide, having improved receptivity for anionic dyes, of the type having recurring amide groups as an integral part of the main polymer chain, and wherein said groups are separated by at least 2 carbon atoms, which comprises the product obtained by polymerizing a polyamide-forming composition comprising substantially equimolar proportions of at least one dicarboxylic acid, of the formula HOOCRCOOH wherein R is a divalent hydrocarbon radical having a chain length of at least 2 carbon atoms and at least one diamine of the formula $NH_2[CH_2]_nNH_2$ wherein $n$ is an integer of at least 2, and from 0.70 to 14.0 mol percent, based on said polyamide-forming composition, of a modifying agent selected from the group consisting of phosphinic acids represented by the formula

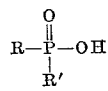

wherein R is selected from the group consisting of monovalent alkyl and aryl hydrocarbon radicals and hydrogen, and R' is selected from the group consisting of monovalent alkyl and aryl hydrocarbon radicals, and the diamine salts of said phosphinic acids.

2. A fiber-forming synthetic linear polycarbonamide, having improved receptivity for anionic dyes, of the type having recurring amide groups as an integral part of the main polymer chain, and wherein said groups are separated by at least 2 carbon atoms, which comprises the product obtained by polymerizing a polyamide-forming composition comprising substantially equimolar proportions of at least one dicarboxylic acid of the formula HOOCRCOOH wherein R is a divalent hydrocarbon radical having a chain length of at least 2 carbon atoms and at least one diamine of the formula $NH_2[CH_2]_nNH_2$ wherein $n$ is an integer of at least 2, and from 0.7 to 1.7 mol percent, based on said polyamide-forming composition, of a modifying agent selected from the group consisting of phosphinic acids represented by the formula

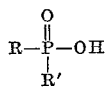

wherein R is selected from the group consisting of monovalent alkyl and aryl hydrocarbon radicals and hydrogen, and R' is selected from the group consisting of monovalent alkyl and aryl hydrocarobn radicals, and the diamine salts of said phosphinic acids.

3. The fiber-forming synthetic linear polycarbonamide set forth in claim 1, wherein said polyamide-forming composition comprises substantially equimolar proportions of adipic acid and hexamethylenediamine.

4. The fiber-forming synthetic linear polycarbonamide set forth in claim 1, wherein said modifying agent is phenyl phosphinic acid.

5. The fiber-forming synthetic linear polycarbonamide set forth in claim 1, wherein said modifying agent is the hexamethylenediamine salt of phenyl phosphinic acid.

6. The fiber-forming synthetic linear polycarbonamide set forth in claim 3, wherein said modifying agent is phenyl phosphinic acid.

7. The fiber-forming synthetic linear polycarbonamide set forth in claim 3, wherein said modifying agent is the hexamethylenediamine salt of phenyl phosphinic acid.

8. A textile fiber comprising the synthetic linear polycarbonamide defined in claim 1.

9. A textile fiber comprising the synthetic linear polycarbonamide defined in claim 3.

10. A process for preparing fiber-forming synthetic linear polycarbonamides with an improved receptivity for anionic dyes which comprises polymerizing a polyamide-forming composition comprising substantially equimolar proportions of at least one dicarboxylic acid of the formula HOOCRCOOH wherein R is a divalent hydrocarbon radical having a chain length of at least 2 carbon atoms and at least one diamine of the formula $NH_2[CH_2]_nNH_2$ wherein $n$ is an integer of at least 2, in the presence of from 0.70 to 14.0 mol percent, based on said polyamide-forming composition, of a modifying agent selected from the group consisting of phosphinic acids represented by the formula

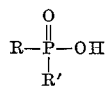

wherein R is selected from the group consisting of monovalent alkyl and aryl hydrocarbon radicals and hydrogen, and R' is selected from the group consisting of monovalent alkyl and aryl hydrocarbon radicals, and the diamine salts of said phosphinic acids.

11. The process set forth in claim 10 wherein the polyamide-forming composition comprises substantially equimolar proportions of adipic acid and hexamethylenediamine.

12. The process set forth in claim 10 wherein the modifying agent is phenyl phosphinic acid.

13. The process set forth in claim 10 wherein the modifying agent is the hexamethylenediamine salt of phenyl phosphinic acid.

14. A process for preparing fiber-forming synthetic linear polycarbonamides with an improved receptivity for anionic dyes which comprises polymerizing a polyamide-forming composition comprising substantially equimolar proportions of at least one dicarboxylic acid of the formula HOOCHCOOH wherein R is a divalent hydrocarbon radical having a chain length of at least 2 carbon atoms and at least one diamine of the formula $NH_2[CH_2]_nNH_2$ wherein $n$ is an integer of at least 2 in the presence of from 0.7 to 1.7 mol percent, based on said polyamide-forming composition, of a modifying agent selected from the group consisting of phosphinic acids represented by the formula

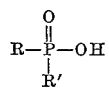

wherein R is selected from the group consisting of monovalent alkyl and aryl hydrocarbon radicals and hydrogen, and R' is selected from the group consisting of monovalent alkyl and aryl hydrocarbon radicals, and the diamine salts of said phosphinic acids.

References Cited by the Examiner
UNITED STATES PATENTS

| | | | |
|---|---|---|---|
| 2,510,777 | 6/1950 | Gray | 260—78 |
| 2,646,420 | 7/1953 | Morgan | 260—78 |
| 2,927,841 | 3/1960 | Ben | 260—78 |
| 2,981,715 | 4/1961 | Ben | 260—78 |

FOREIGN PATENTS

| | | |
|---|---|---|
| 797,038 | 6/1958 | Great Britain. |

WILLIAM H. SHORT, *Primary Examiner.*

B. MANGAN, LOUISE P. QUAST, *Examiners.*